US 12,195,284 B2

(12) United States Patent
Asanuma

(10) Patent No.: US 12,195,284 B2
(45) Date of Patent: Jan. 14, 2025

(54) SUPPLY APPARATUS

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Reiya Asanuma, Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 68 days.

(21) Appl. No.: 17/934,497

(22) Filed: Sep. 22, 2022

(65) Prior Publication Data
US 2023/0249920 A1    Aug. 10, 2023

Related U.S. Application Data

(63) Continuation of application No. PCT/JP2021/004152, filed on Feb. 4, 2021.

(51) Int. Cl.
*B65G 47/30* (2006.01)
*B07C 1/04* (2006.01)
*B65G 21/20* (2006.01)

(52) U.S. Cl.
CPC .............. *B65G 47/30* (2013.01); *B07C 1/04* (2013.01); *B65G 21/2072* (2013.01)

(58) Field of Classification Search
CPC .... B65G 47/30; B65G 21/2072; B65G 47/68; B65G 47/24; B65G 2203/0225;
(Continued)

(56) References Cited

U.S. PATENT DOCUMENTS 5,236,077 A * 8/1993 Hoppmann .......... B65G 47/525
198/395
5,439,098 A * 8/1995 Bonnet ................ B65G 15/02
198/831
(Continued)

FOREIGN PATENT DOCUMENTS

JP    S 61188321 A    8/1986
JP    H6-278843 A    10/1994
(Continued)

OTHER PUBLICATIONS

Intellectual Property Office of Singapore, Search Report and Written Opinion, 10 pages ( Jul. 31, 2023).
(Continued)

*Primary Examiner* — Gene O Crawford
*Assistant Examiner* — Muhammad Awais
(74) *Attorney, Agent, or Firm* — Finnegan, Henderson, Farabow, Garrett & Dunner, LLP

(57) ABSTRACT

According to an embodiment, a supply apparatus includes first, second and third conveyance portions. The first conveyance portion removes processing targets from a feeder in which the processing targets are placed. The first conveyance portion conveys the processing targets along a first conveyance direction. The second conveyance portion is disposed on a downstream side of the first conveyance portion. In the second conveyance portion, a plurality of conveyance portions having mutually different conveyance directions are sequentially connected. The second conveyance portion conveys the processing targets from an upstream side to the downstream side along a second conveyance direction. The third conveyance portion is disposed on a downstream side of the second conveyance portion. The third conveyance portion conveys the processing targets along a third conveyance direction while sepa- (Continued)

rating the processing targets from each other at a predetermined pitch.

10 Claims, 6 Drawing Sheets

(58) Field of Classification Search
CPC .... B65G 2203/0233; B65G 2203/0283; B65G 47/52; B07C 1/04
USPC ........................................................ 198/443
See application file for complete search history.

(56) References Cited

U.S. PATENT DOCUMENTS

| | | | |
|---|---|---|---|
| 5,769,204 A | 6/1998 | Okada et al. | |
| 5,950,800 A * | 9/1999 | Terrell | B65G 47/1492 198/452 |
| 6,259,967 B1 * | 7/2001 | Hartlepp | B65G 47/1492 198/444 |
| 6,269,933 B1 * | 8/2001 | Schuitema | B65G 47/5145 198/370.1 |
| 6,401,936 B1 | 6/2002 | Isaacs et al. | |
| 7,861,847 B2 * | 1/2011 | Fourney | B65G 17/24 198/433 |
| 8,240,456 B2 * | 8/2012 | Duchemin | B65G 47/29 198/460.1 |
| 8,528,742 B2 * | 9/2013 | Wargo | B65G 15/30 209/663 |
| 9,878,349 B2 * | 1/2018 | Crest | B07C 1/06 |
| 10,166,575 B2 * | 1/2019 | Schroader | B65G 15/00 |
| 10,315,859 B1 * | 6/2019 | Zhao | B65G 47/766 |
| 10,773,898 B2 * | 9/2020 | Perrot | B65G 43/08 |
| 10,815,073 B1 * | 10/2020 | Dwivedi | B65G 47/682 |
| 10,870,543 B1 * | 12/2020 | Dwivedi | B65G 47/44 |
| 2001/0030102 A1 | 10/2001 | Woltjer et al. | |
| 2016/0052722 A1 * | 2/2016 | Fujihara | B65G 43/08 198/358 |
| 2019/0161285 A1 | 5/2019 | Perrot et al. | |
| 2020/0130939 A1 * | 4/2020 | Davies | B65G 21/12 |
| 2022/0105543 A1 | 4/2022 | Usami et al. | |

FOREIGN PATENT DOCUMENTS

| | | | | |
|---|---|---|---|---|
| JP | H10-273219 A | | 10/1998 | |
| JP | 2000-118687 A | | 4/2000 | |
| JP | 2001-48341 A | | 2/2001 | |
| JP | 2001048341 A | * | 2/2001 | |
| JP | 2017-507020 A | | 3/2017 | |
| JP | 2019-519449 A | | 7/2019 | |
| JP | 2019116382 A | * | 7/2019 | |
| JP | 2021-1065 A | | 1/2021 | |
| JP | 2021-1066 A | | 1/2021 | |
| WO | WO-2006010032 A2 | * | 1/2006 | ......... B65G 47/2445 |
| WO | WO-2019082113 A1 | * | 5/2019 | ......... B25J 15/0033 |
| WO | WO 2021/205733 A1 | | 10/2021 | |

OTHER PUBLICATIONS

International Search Report of PCT /JP2021 /004152, filed Feb. 4, 2021.

IP Australia, Examination Report No. 1 for Application No. 2021254011, 8 pages (Oct. 20, 2023).

European Patent Office, Supplementary European Search Report, 8 pages, Apr. 9, 2024.

Canadian Intellectual Property Office, Requisition/Search Report in CA 3,172,892, 5 pages (Jan. 25, 2024).

* cited by examiner

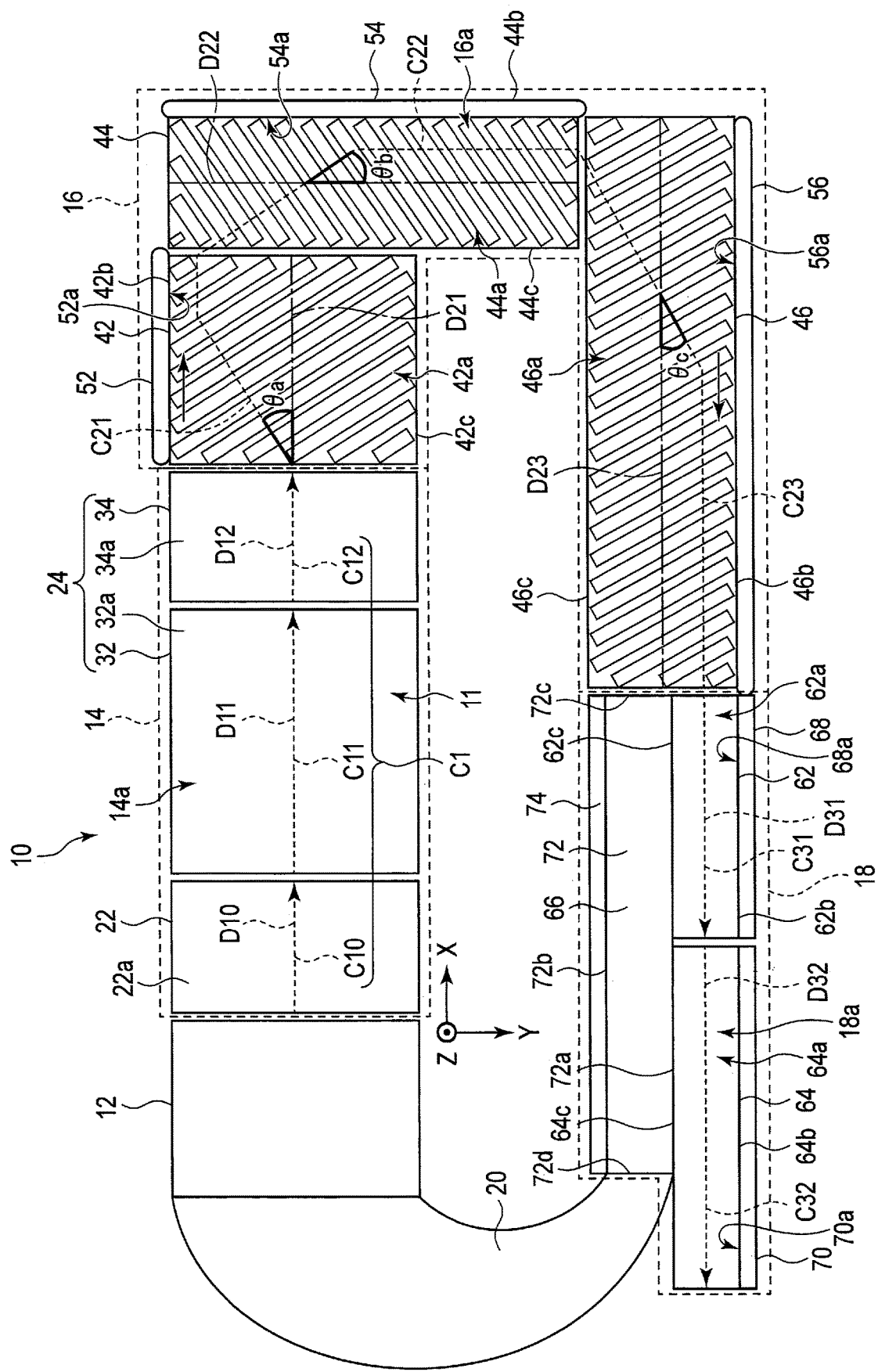
F I G. 2

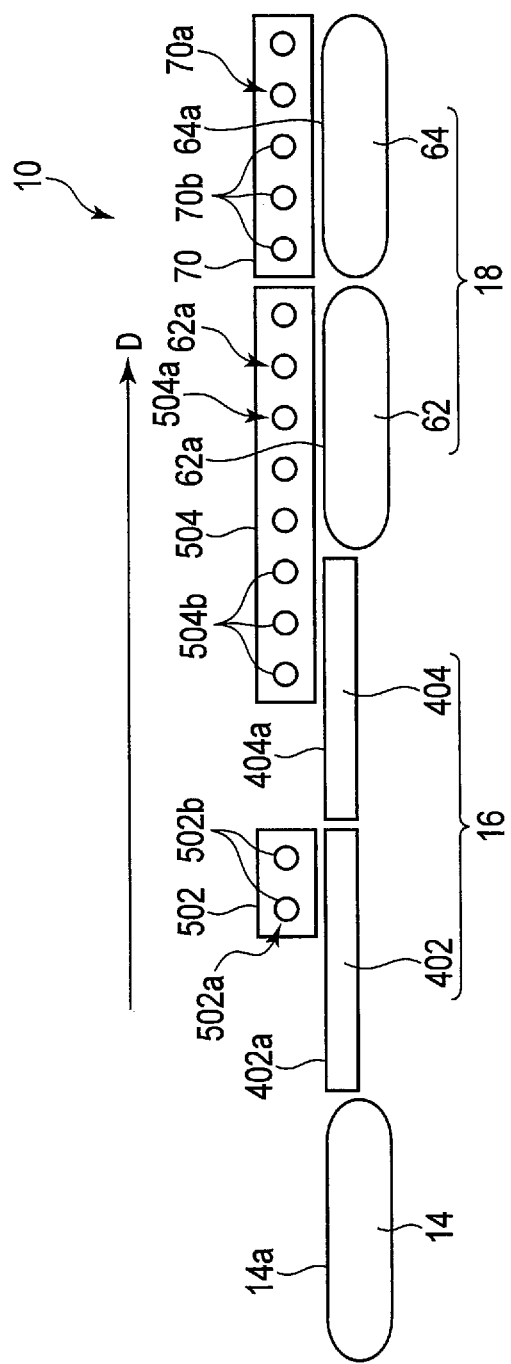
F I G. 6

SUPPLY APPARATUS

CROSS-REFERENCE TO RELATED APPLICATIONS

This application is a Continuation Application of PCT Application No. PCT/JP2021/004152, filed Feb. 4, 2021, and based upon and claiming the benefit of priority from prior Japanese Patent Application No. 2020-070241, filed Apr. 9, 2020, the entire contents of all of which are incorporated herein by reference.

FIELD

Embodiments of the present invention relate to a supply apparatus for processing targets.

BACKGROUND

In order to separate a load overlaid on an upper side of a certain load from a lower-side load, a technique using a sloping, inclined conveyor is known, for example.

BRIEF DESCRIPTION OF THE DRAWINGS

FIG. 2 is a schematic view illustrating a state in which the supply apparatus illustrated in FIG. 1 is viewed from above.

FIG. 6 is a schematic view illustrating a state of a conveyance path along a direction of extension in which the conveyance path of the supply apparatus illustrated in FIG. 5 extends.

DETAILED DESCRIPTION

An object of an embodiment is to provide a supply apparatus that facilitates handling, by a later-stage apparatus, of processing targets in a multi-layered bulk-loaded state or the like.

According to the embodiment, a supply apparatus includes a first conveyance portion, a second conveyance portion and a third conveyance portion. The first conveyance portion is configured to remove a plurality of processing targets from a feeder in which the processing targets are placed. The first conveyance portion is configured to convey the processing targets along a first conveyance direction. The second conveyance portion is disposed on a downstream side of the first conveyance portion. In the second conveyance portion, a plurality of conveyance portions having mutually different conveyance directions are sequentially connected. The second conveyance portion conveys the processing targets from an upstream side to the downstream side along a second conveyance direction. The third conveyance portion is disposed on a downstream side of the second conveyance portion. The third conveyance portion conveys the processing targets along a third conveyance direction while separating the processing targets from each other at a predetermined pitch.

A supply apparatus 10 will be described hereinbelow with reference to the drawings.

The supply apparatus (the load supply apparatus) 10 separates (divides up) a multi-layered load, and supplies the load (processing targets) at predetermined time intervals (predetermined pitches) to a sorting apparatus (distribution sorter) that sorts the multi-layered load according to each destination in, for example, a distribution system. In addition, the supply apparatus (component supply apparatus) 10 is, for example, in part of a manufacturing line, and separates (divides up) a large number of components (processing targets) of the same type or different types, and supplies a load (processing targets) to a later-stage apparatus at predetermined time intervals (predetermined pitch).

First Embodiment

A supply apparatus 10 according to a first embodiment will be described using FIGS. 1 to 3.

Figure 1:
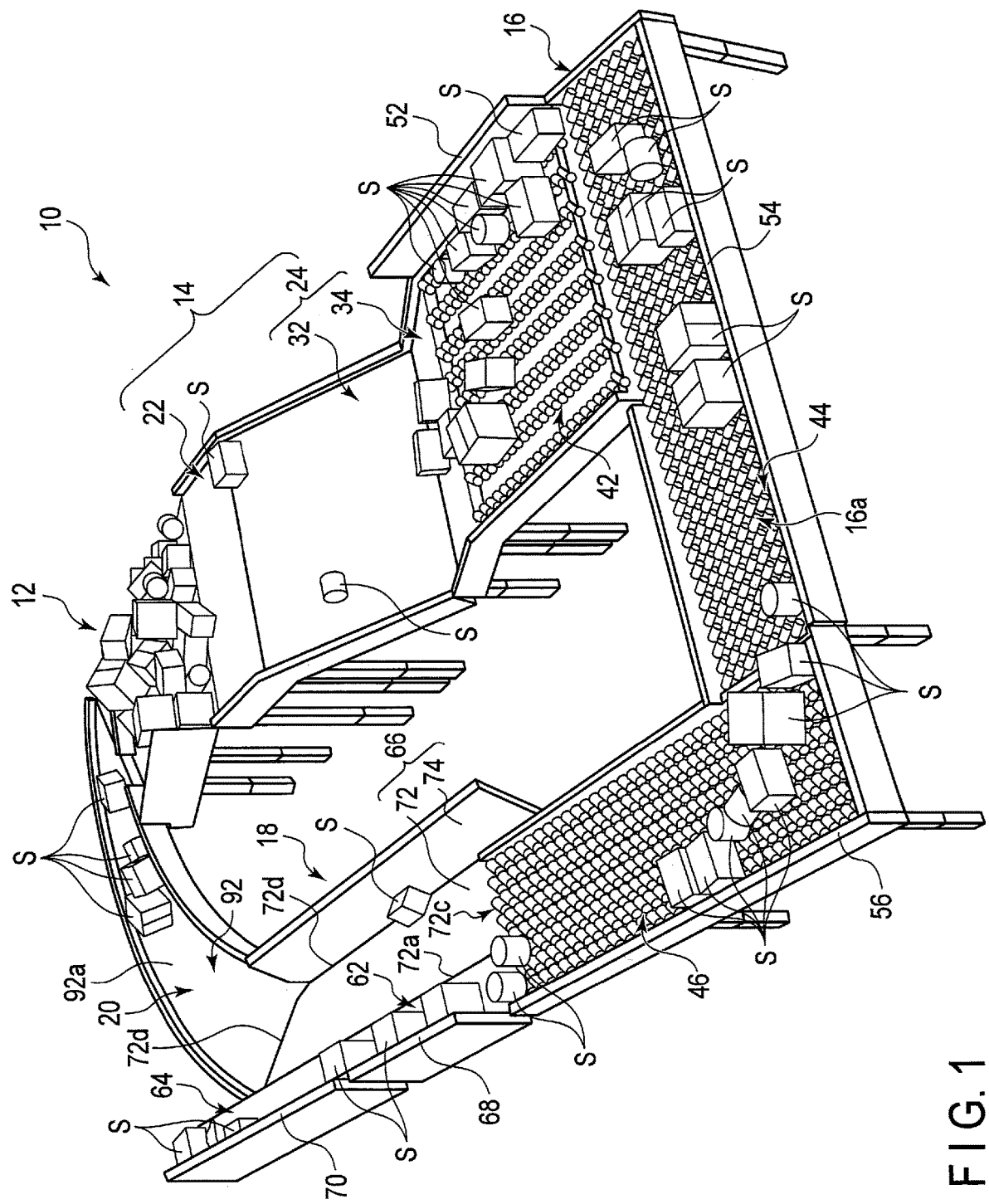
FIG. 1 is a schematic perspective view illustrating an operating state of a supply apparatus according to a first embodiment.

FIG. 1 is a schematic perspective view illustrating an operating state of the supply apparatus 10. FIG. 2 is a schematic view illustrating a state in which the supply apparatus 10 illustrated in FIG. 1 is viewed from above. An XYZ orthogonal coordinate system is defined in the supply apparatus 10 in FIG. 2. FIG. 3 illustrates a state in which the outside (one direction) is viewed from the inside (another direction) of the end, in the width direction orthogonal to the direction of extension, of a conveyance path. Therefore, FIG. 3 is a schematic view illustrating inclined states and height differences of a conveyance path along a direction of extension D when it is assumed that the directions of extension D (D10, D11, D12, D21, D22, D23, D31, D32) of a series of conveyance paths of the supply apparatus 10 illustrated in FIG. 2 are straight. FIG. 4 is a schematic view illustrating an article sorting apparatus (distribution sorter) 110 that processes processing targets S which are supplied from the supply apparatus 10.

As illustrated in FIGS. 1 and 2, the supply apparatus 10 includes a feeder 12 into which a plurality of processing targets S are fed, a first conveyance portion 14, a second conveyance portion 16, and a third conveyance portion 18.

An example of the feeder 12 is a basket. For example, the plurality of processing targets S are stored in the feeder 12 because a tipper, into which the plurality of (large number of) processing targets S are fed, is inclined, thus causing the plurality of processing targets S to slide with respect to the tipper. The processing targets S placed in the feeder 12 then make contact with, for example, an upstream end of a first conveyance path 14a.

Note that, in the present embodiment, the end on the upstream side of the conveyance path itself is defined as the upstream end, and the end on the downstream side is defined as the downstream end.

The first conveyance portion 14 includes the first conveyance path 14a, which conveys the processing targets S from the upstream side to the downstream side along a first conveyance direction C1 (C10, C11, C12). As illustrated in FIG. 2, the directions of extension D10, D11, and D12 of the first conveyance portion 14 are, taken as a whole, apparently straight along the X-axis direction, but as illustrated in FIG. 3, the directions of extension D11 and D12 are inclined with respect to the X-axis and the Z-axis along the plane ZX. The directions of extension D11, D12 are inclined with respect to a horizontal plane (ground).

The second conveyance portion 16 includes a second conveyance path 16a that is disposed on the downstream side of the first conveyance path 14a of the first conveyance portion 14, and that is bent in a U shape (including a J shape), for example. The second conveyance path 16a of the second conveyance portion 16 conveys the processing targets S from the upstream side to the downstream side along second conveyance directions C21, C22, and C23.

The third conveyance portion 18 includes a third conveyance path 18a that is disposed on the downstream side of the second conveyance path 16a and that conveys the processing targets S from the upstream side to the downstream side along a third conveyance direction C32. The third conveyance portion 18 is straight along the X-axis direction. For example, a load feeder 112 of the distribution sorter 110 of the distribution system illustrated in FIG. 4 is disposed on the downstream side of the third conveyance portion 18. A component feeder (not illustrated) of the manufacturing line may be disposed on the downstream side of the third conveyance portion 18 instead of the distribution sorter 110.

As illustrated in FIG. 2, when the supply apparatus 10 is viewed from above, the first conveyance portion 14 and the third conveyance portion 18 are separated from each other in the Y-axis direction. Therefore, the first conveyance portion 14 and the third conveyance portion 18 face each other with a space interposed therebetween. A horizontal component of the first conveyance path 14a which is in the first conveyance direction C1 and a horizontal component of the third conveyance path 18a which is in the third conveyance direction C32 are each straight. The horizontal component of the first conveyance path 14a which is in the first conveyance direction C1 and the horizontal component of the third conveyance path 18a which is in the third conveyance direction C32 are parallel (including substantially parallel) to each other and directed in opposite directions.

The first conveyance portion 14 includes a first conveyor portion (removal conveyance portion) 22 adjacent to the downstream side of the feeder 12 along the X axis, and a second conveyor portion 24 disposed on the downstream side of the first conveyor portion 22 along the X axis. In the present embodiment, the first conveyor portion 22 includes a conveyance path 22a which is horizontal to a horizontal plane (ground) formed of, for example, an endless belt. The second conveyor portion 24 includes a first inclined conveyor (downward-inclined conveyance portion) 32 including a conveyance path 32a which is inclined with respect to the horizontal plane as a downward slope formed of, for example, an endless belt, and a second inclined conveyor (upward-inclined conveyance portion) 34 including a conveyance path 34a which is inclined with respect to the horizontal plane as an upward slope formed of, for example, an endless belt. The first inclined conveyor 32 is adjacent to the downstream side of the first conveyor portion 22. The second inclined conveyor 34 is adjacent to the downstream side of the first inclined conveyor 32. The first inclined conveyor (downward-inclined conveyance portion) 32 is inclined downward along the first conveyance direction C1 due to its downward slope. The second inclined conveyor (upward-inclined conveyance portion) 34 is inclined upward along the first conveyance direction C1 due to an upward slope.

The conveyance speed V10 along the conveyance direction C10 of the conveyance path 22a of the first conveyor portion 22 is equal to or higher than the conveyance speed V11 along the conveyance direction C11 of the conveyance path 32a of the first inclined conveyor 32 of the second conveyor portion 24. The conveyance speed V12 along the conveyance direction C12 of the conveyance path 34a of the second inclined conveyor 34 of the second conveyor portion 24 is equal to or higher than the conveyance speed V11 along the conveyance direction C11 of the conveyance path 32a of the first inclined conveyor 32 of the second conveyor portion 24.

Figure 3:
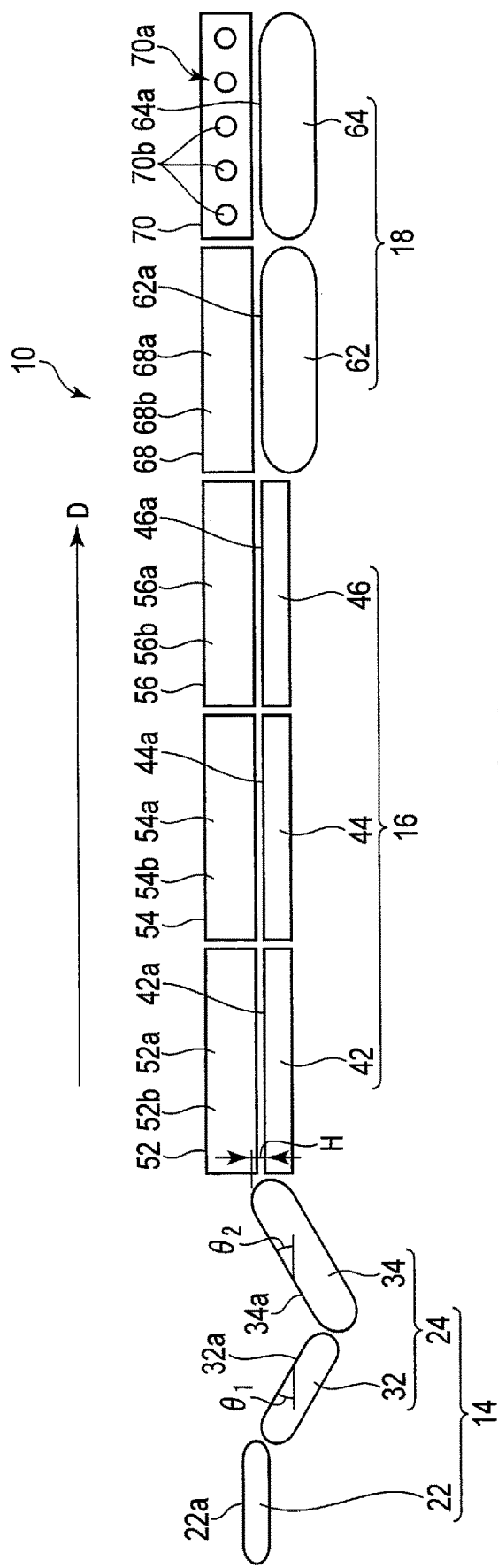
FIG. 3 is a schematic view illustrating a state of a conveyance path along a direction of extension in which the conveyance path of the supply apparatus illustrated in FIGS. 1 and 2 extends.
Figure 4:
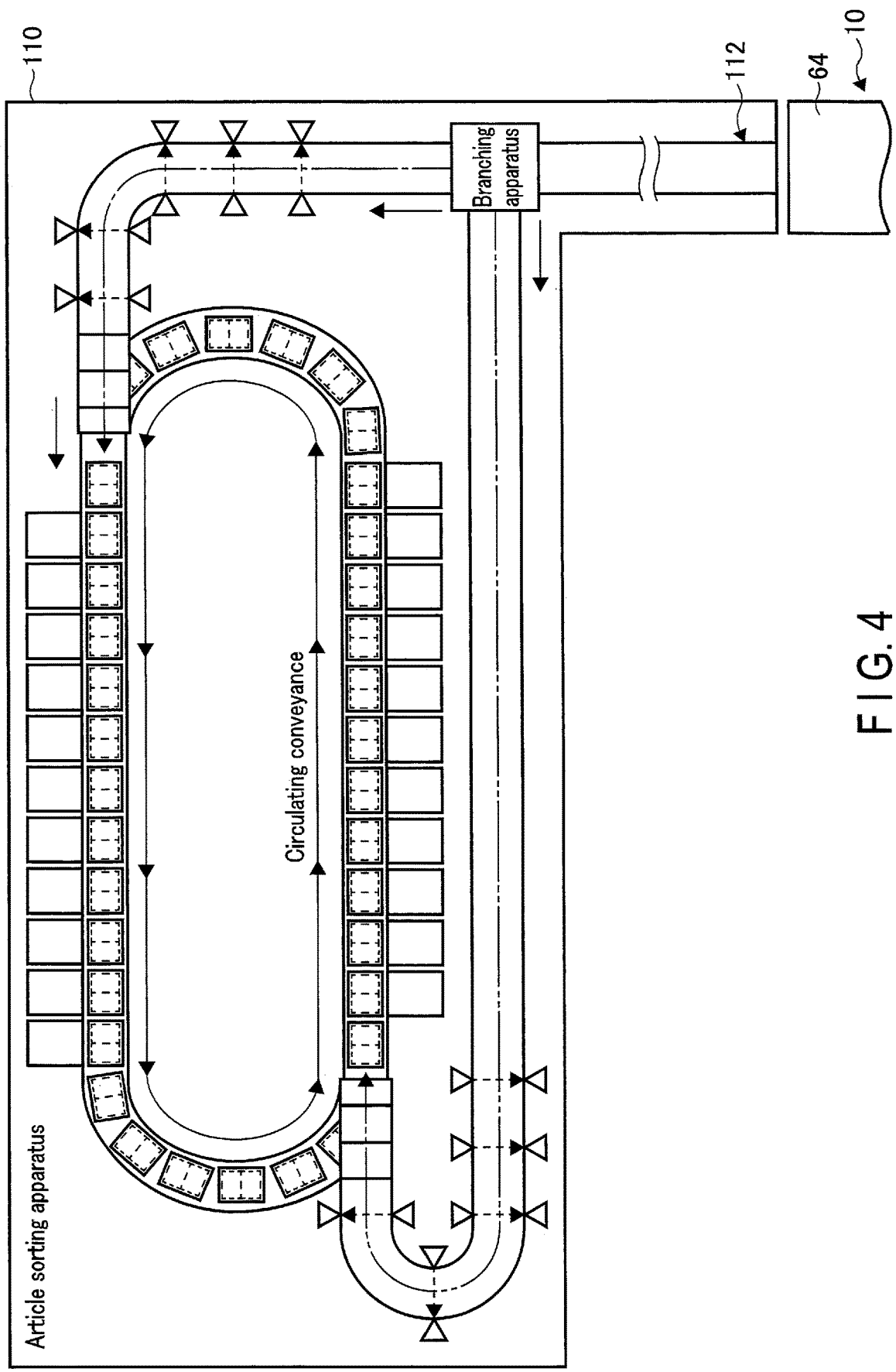
FIG. 4 is a schematic view illustrating an article sorting apparatus that processes processing targets which are supplied from the supply apparatus illustrated in FIG. 1.

An inclination angle $\theta 1$ of the conveyance path 32a of the first inclined conveyor 32 with respect to the horizontal plane illustrated in FIG. 3 is preferably, for example, about 10° to 40°. An inclination angle $\theta 2$ of the conveyance path 34a of the second inclined conveyor 34 with respect to the horizontal plane is preferably, for example, about 10° to 40°.

It is preferable that the upstream end of the conveyance path 32a of the first inclined conveyor 32 is slightly lower between the downstream end of the conveyance path 22a of the first conveyor portion 22 and the upstream end of the first inclined conveyor 32. In this case, the processing targets S are easily delivered between the conveyance path 22a of the first conveyor portion 22 and the conveyance path 32a of the first inclined conveyor 32.

As illustrated in FIGS. 1 and 2, the second conveyance portion 16 includes a first side-alignment conveyor (first side-alignment conveyance portion) 42, which is adjacent to the downstream side of the first conveyance portion 14 along the X axis, a second side-alignment conveyor (second side-alignment conveyance portion) 44, and a third side-alignment conveyor (third side-alignment conveyance portion) 46. In the second conveyance portion 16, the plurality of conveyors (conveyance portions) 42, 44, and 46 are connected so as to have each different directions of extension D21, D22, and D23 and conveyance directions C21, C22, and C23. The directions of extension D21, D22, and D23 of the plurality of conveyors 42, 44, and 46 of the second conveyance portion 16 are U-shaped overall. The three conveyors 42, 44, and 46 may be arranged adjacent to each other, and do not need to be integrated as one conveyor.

The first side-alignment conveyor 42 of the second conveyance portion 16 is installed on the downstream side of the first conveyance portion 14 along the first conveyance direction C1. The second side-alignment conveyor 44 is installed on the downstream side of the first side-alignment conveyor 42 along a direction intersecting the first side-alignment conveyor 42. The third side-alignment conveyor 46 is installed on the downstream side of the second side-alignment conveyor 44 along a direction intersecting the second side-alignment conveyor 44.

As illustrated in FIG. 2, when the supply apparatus 10 is viewed from above, the first side-alignment conveyor 42 extends along the direction of extension D21. The direction of extension D21 of the first side-alignment conveyor 42 substantially coincides with the horizontal component of the first conveyance direction C1. The conveyance path 42a of the first side-alignment conveyor 42 is, for example, parallel to the plane XY. The conveyance direction C21 of the processing targets S due to the conveyance path 42a of the first side-alignment conveyor 42 is shifted from the horizontal component in the first conveyance direction C1. An inclined roller conveyor, for example, is used as the first side-alignment conveyor 42. The conveyance direction C21 is inclined at an inclination angle $\theta a$ with respect to the direction of extension D21 of the conveyance path 42a of the first side-alignment conveyor 42. The inclination angle $\theta a$ is preferably, for example, about 10° to 40°. Therefore, the first side-alignment conveyor 42 is capable of bringing the processing targets S placed on the conveyance path 42a of the first side-alignment conveyor 42 in one direction in the width direction orthogonal to the direction of extension D21, that is, one end 42b.

Assuming that the conveyance speed along the conveyance direction C21 due to the conveyance path 42a of the first side-alignment conveyor 42 is V21, the conveyance path 42a of the first side-alignment conveyor 42 moves the processing targets S along the direction of extension D21 of the first side-alignment conveyor 42 at a speed of V21·cos θa. The conveyance speed V21 along the conveyance direction C21 of the conveyance path 42a of the first side-alignment conveyor 42 is preferably higher than the conveyance speed V12 along the conveyance direction C12 of the conveyance path 34a of the second inclined conveyor 34.

At an end (outside end) 42b in one direction in the width direction orthogonal to the direction of extension D21 of the first side-alignment conveyor 42, a first wall portion 52 serving as a wall that prevents the processing targets S from falling off from one direction of the first side-alignment conveyor 42 is provided. The first wall portion 52 extends, for example, parallel to the direction of extension D21 of the conveyance path 42a of the first side-alignment conveyor 42. Due to the presence of the first wall portion 52, the processing targets S are prevented from falling off from the end in one direction of the first side-alignment conveyor 42.

The first wall portion 52 includes an auxiliary conveyance portion 52a that actively or passively conveys the processing targets S along the first direction of extension D21 from the upstream side to the downstream side of the conveyance path 42a of the first side-alignment conveyor 42. The auxiliary conveyance portion 52a of the first wall portion 52 is directed toward the other end (inside end) 42c in the width direction orthogonal to the direction of extension D21 of the first side-alignment conveyor 42.

Here, a case where the auxiliary conveyance portion 52a of the first wall portion 52 actively conveys the processing targets S along the first direction of extension D21 from the upstream side to the downstream side of the conveyance path 42a of the first side-alignment conveyor 42 will be described as an example.

The auxiliary conveyance portion 52a includes an endless belt similar to that used in, for example, a belt conveyor. The normal direction of a conveyance surface 52b of the endless belt is, for example, horizontal and faces the inside (other direction) in the width direction. The conveyance surface 52b of the endless belt of the auxiliary conveyance portion 52a operates to move the processing targets S from the upstream side to the downstream side at a speed of, for example, V21·cos θa and parallel to the first direction of extension D21.

As illustrated in FIG. 3, a step H of, for example, about 10 cm is preferably formed between the downstream end of the second inclined conveyor 34 and the upstream end of the first side-alignment conveyor 42.

The second side-alignment conveyor 44 extends, for example, in a direction along the Y axis orthogonal to the direction of extension D21 (direction along the X axis) of the first side-alignment conveyor 42. The conveyance path 44a of the second side-alignment conveyor 44 is, for example, parallel to the plane XY. An inclined roller conveyor, for example, is used as the second side-alignment conveyor 44. The conveyance direction C22 of the second side-alignment conveyor 44 is inclined at an inclination angle θb with respect to the direction of extension D22 of the second side-alignment conveyor 44. The inclination angle θb is preferably, for example, about 10° to 40°. Therefore, the second side-alignment conveyor 44 is capable of bringing the processing targets S placed on the conveyance path 44a of the second side-alignment conveyor 44 in one direction in the width direction orthogonal to the direction of extension D22, that is, one end 44b.

Assuming that the conveyance speed along the conveyance direction C22 due to the conveyance path 44a of the second side-alignment conveyor 44 is V22, the conveyance path 44a of the second side-alignment conveyor 44 operates to move the processing targets S along the direction of extension D22 of the second side-alignment conveyor 44 at a speed of V22·cos θb (≥V21·cos θa). The conveyance speed V22 along the conveyance direction C22 of the conveyance path 44a of the second side-alignment conveyor 44 is preferably higher than the conveyance speed V21 along the conveyance direction C21 of the conveyance path 42a of the first side-alignment conveyor 42.

At an end (outside end) 44b in one direction in the width direction orthogonal to the direction of extension D22 of the second side-alignment conveyor 44, a second wall portion 54 serving as a wall that prevents the processing targets S from falling off from one direction of the second side-alignment conveyor 44 is provided. The second wall portion 54 extends, for example, parallel to the direction of extension D22 of the conveyance path 44a of the second side-alignment conveyor 44. Due to the presence of the second wall portion 54, the processing targets S are prevented from falling off from the second side-alignment conveyor 44.

The second wall portion 54 includes an auxiliary conveyance portion 54a that actively or passively conveys the processing targets S along the second direction of extension D22 from the upstream side to the downstream side of the conveyance path 44a of the second side-alignment conveyor 44. The auxiliary conveyance portion 54a of the second wall portion 54 is directed toward the other end (inside end) 44c in the width direction orthogonal to the direction of extension D22 of the second side-alignment conveyor 44.

Here, a case where the auxiliary conveyance portion 54a of the second wall portion 54 actively conveys the processing targets S along the second direction of extension D22 from the upstream side to the downstream side of the conveyance path 44a of the second side-alignment conveyor 44 will be described as an example.

The auxiliary conveyance portion 54a is formed similarly to the auxiliary conveyance portion 52a, for example. Therefore, the conveyance surface 54b of an endless belt of the auxiliary conveyance portion 54a operates to move the processing targets S from the upstream side to the downstream side at a speed of, for example, V22·cos θb and parallel to the second direction of extension D22.

The third side-alignment conveyor 46 is adjacent to the downstream side of the second side-alignment conveyor 44 along the Y axis. The third side-alignment conveyor 46 extends, for example, in a direction orthogonal to the direction of extension D22 of the second side-alignment conveyor 44. The conveyance path 46a of the third side-alignment conveyor 46 is, for example, parallel to the plane XY. An inclined roller conveyor, for example, is used as the third side-alignment conveyor 46. The conveyance direction C23 of the third side-alignment conveyor 46 is inclined at an inclination angle θc with respect to the direction of extension D23 of the third side-alignment conveyor 46. The inclination angle θc is preferably, for example, about 10° to 40°. Therefore, the third side-alignment conveyor 46 is capable of bringing the processing targets S placed on the conveyance path 46a of the third side-alignment conveyor 46 in one direction in the width direction orthogonal to the direction of extension D23, that is, one end 46b.

Assuming that the conveyance speed along the conveyance direction C23 due to the conveyance path 46a of the third side-alignment conveyor 46 is V23, the conveyance path 46a of the third side-alignment conveyor 46 operates to move the processing targets S along the direction of extension D23 of the third side-alignment conveyor 46 at a speed of V23·cos θc (≥V22·cos θb). The conveyance speed V23 along the conveyance direction C23 of the conveyance path 46a of the third side-alignment conveyor 46 is preferably higher than the conveyance speed V22 along the conveyance direction C22 of the conveyance path 44a of the second side-alignment conveyor 44.

At an end (outside end) 46b in one direction in the width direction orthogonal to the direction of extension. D23 of the third side-alignment conveyor 46, a third wall portion 56 serving as a wall that prevents the processing targets S from falling off from one direction of the third side-alignment conveyor 46 is provided. The third wall portion 56 extends, for example, parallel to the direction of extension D23 of the conveyance path 46a of the third side-alignment conveyor 46. Due to the presence of the third wall portion 56, the processing targets S are prevented from falling off from the third side-alignment conveyor 46.

The third wall portion 56 includes an auxiliary conveyance portion 56a that actively or passively conveys the processing targets S along the third direction of extension D23 from the upstream side to the downstream side of the conveyance path 46a of the third side-alignment conveyor 46. The auxiliary conveyance portion 56a of the third wall portion 56 is directed toward the other end (inside end) 46c in the width direction orthogonal to the direction of extension D23 of the third side-alignment conveyor 46.

Here, a case where the auxiliary conveyance portion 56a of the third wall portion 56 actively conveys the processing targets S along the third direction of extension D23 from the upstream side to the downstream side of the conveyance path 46a of the third side-alignment conveyor 46 will be described as an example.

The auxiliary conveyance portion 56a is formed similarly to the auxiliary conveyance portions 52a, 54a, for example. Therefore, the conveyance surface 56b of an endless belt of the auxiliary conveyance portion 56a moves the processing targets S from the upstream side to the downstream side at a speed of, for example, V23·cos θc and parallel to the third direction of extension D23.

The third conveyance portion 18 includes a narrow conveyor 62, a speed-regulating conveyor 64, and a recovery portion 66. In the third conveyance portion 18, for example, a camera (sensor) (not illustrated) is installed for recognizing the speed of the conveyance path 62a of the narrow conveyor 62 and the distance of the processing targets S before and after the conveyance path 62a.

The narrow conveyor 62 is adjacent to the downstream side of the third side-alignment conveyor 46 along the X axis. The upstream end of the narrow conveyor 62 is formed to have a width smaller than the width in the width direction orthogonal to the direction of extension D23 of the downstream end of the third side-alignment conveyor 46. The width of the narrow conveyor 62 is set according to the sizes of the processing targets S, for example. The narrow conveyor 62 has a width that does not allow a plurality of processing targets S of an appropriate size to be arranged in the width direction. The narrow conveyor 62 includes the conveyance path 62a which is horizontal to the horizontal plane (ground) formed of, for example, an endless belt. The upstream end of the conveyance path 62a of the narrow conveyor 62 is arranged in a position adjacent to the downstream end in one direction in the width direction of the conveyance path 46a of the third side-alignment conveyor 46. The conveyance direction C31 of the narrow conveyor 62 is parallel to the direction of extension D31 of the narrow conveyor 62. The conveyance speed V31 along the conveyance direction C31 of the conveyance path 62a of the narrow conveyor 62 is preferably higher than the conveyance speed V23 along the conveyance direction C23 of the conveyance path 46a of the third side-alignment conveyor 46.

At an end (outside end) 62b in one direction in the width direction orthogonal to the direction of extension D31 (conveyance direction C31) of the narrow conveyor 62, a fourth wall portion 68 serving as a wall that prevents the processing targets S from falling off from one direction of the narrow conveyor 62 is provided. The fourth wall portion 68 extends, for example, parallel to the direction of extension D31 of the conveyance path 62a of the narrow conveyor 62. Due to the presence of the fourth wall portion 68, the processing targets S are prevented from falling off from the narrow conveyor 62.

Note that the end (outside end) 62b of the narrow conveyor 62 and the end (outside end) 46b of the third side-alignment conveyor 46 are preferably on a straight line along the X axis.

The fourth wall portion 68 includes an auxiliary conveyance portion 68a that actively or passively conveys the processing targets S along the direction of extension D31 from the upstream side to the downstream side of the conveyance path 62a of the narrow conveyor 62. The auxiliary conveyance portion 68a of the fourth wall portion 68 is directed toward the other end (inside end) 62c in the width direction orthogonal to the direction of extension D31 of the narrow conveyor 62.

Here, a case where the auxiliary conveyance portion 68a of the fourth wall portion 68 actively conveys the processing targets S along the direction of extension D31 from the upstream side to the downstream side of the conveyance path 62a of the narrow conveyor 62 will be described as an example.

The auxiliary conveyance portion 68a is formed similarly to the auxiliary conveyance portions 52a, 54a, 56a, for example. Therefore, the conveyance surface 68b of an endless belt of the auxiliary conveyance portion 68a moves the processing targets S from the upstream side to the downstream side at a speed of, for example, V31 and parallel to the direction of extension D31.

Note that a horizontal component of the first conveyance path 14a which is in the first conveyance direction C1 and a horizontal component of the third conveyance path 18a which is in the third conveyance direction C32 are each straight.

The speed-regulating conveyor 64 is adjacent to the downstream side of the narrow conveyor 62 along the X axis. The conveyance path 64a of the speed-regulating conveyor 64 is appropriately controlled to accelerate/decelerate relative to the conveyance speed of the conveyance path 62a of the narrow conveyor 62 so that the processing targets S placed on the conveyance path 64a are separated from each other at a predetermined pitch.

The upstream end of the speed-regulating conveyor 64 is formed to have substantially the same width as the width in the width direction orthogonal to the direction of extension D31 of the downstream end of the narrow conveyor 62. The conveyance path 64a of the speed-regulating conveyor 64 is horizontal to the horizontal plane (ground) formed of, for example, an endless belt. The conveyance direction C32 of the speed-regulating conveyor 64 is parallel to the direction of extension D32 of the speed-regulating conveyor 64. The conveyance speed V32 along the conveyance direction C32 of the conveyance path 64a of the speed-regulating conveyor 64 is controlled so as to separate the pitch between the processing targets S arranged in a line to establish a predetermined pitch. Therefore, the conveyance speed V32 along the conveyance direction C32 of the conveyance path 64a of the speed-regulating conveyor 64 can be increased and decreased.

At an end (outside end) 64b in one direction in the width direction orthogonal to the direction of extension D32 (conveyance direction C32) of the speed-regulating conveyor 64, a fifth wall portion 70 serving as a wall that prevents the processing targets S from falling off from one direction of the speed-regulating conveyor 64 is provided. The fifth wall portion 70 extends, for example, parallel to the direction of extension D32 of the conveyance path 64a of the speed-regulating conveyor 64. Due to the presence of the fifth wall portion 70, the processing targets S are prevented from falling off from the speed-regulating conveyor 64.

Note that the end (outside end) 64b of the speed-regulating conveyor 64 and the end (outside end) 62b of the narrow conveyor 62 are preferably on a straight line along the X axis.

The fifth wall portion 70 includes an auxiliary conveyance portion 70a that actively or passively conveys the processing targets S along the direction of extension D32 from the upstream side to the downstream side of the conveyance path 64a of the speed-regulating conveyor 64. The auxiliary conveyance portion 70a of the fifth wall portion 70 is directed toward the other end (inside end) 64c in the width direction orthogonal to the direction of extension D32 of the speed-regulating conveyor 64.

For example, the auxiliary conveyance portion 70a may be formed as a conveyance surface that actively conveys the processing targets S similarly to the conveyance surfaces 52b, 54b, 56b, and 68b of the auxiliary conveyance portions 52a, 54a, 56a, and 68a. Here, the auxiliary conveyance portion 70a includes a plurality of rollers 70b that passively rotate upon contact with the processing targets S. The rollers 70b in FIG. 3 are arranged, for example, in a lattice pattern or in a line. The rollers 70b are each formed in a spherical shape and are freely rotatable in these positions.

Note that the rollers 70b may also be formed so as to rotate about axes parallel to the Z axis, like rollers (wheels) of a roller conveyor.

The recovery portion 66 is adjacent to the downstream end along the X axis of the conveyance path 46a of the third side-alignment conveyor 46 of the second conveyance portion 16 and is adjacent to the other direction (inside) in the width direction of the narrow conveyor 62. The recovery portion 66 includes an inclined surface 72 and a guide 74.

The inclined surface 72 is formed as a flat surface or a curved surface. The inclined surface 72 is higher in a position (first end 72a) closer to the narrow conveyor 62, and is lower in a position (second end 72b) closer to the other side in the width direction orthogonal to the horizontal component of the first conveyance portion 14 which is in the conveyance direction C1. The inclined surface 72 is higher in a position (third end 72c) closer to the downstream end of the conveyance path 46a of the third side-alignment conveyor 46, and is lower in a position (fourth end 72d) away from the downstream end of the conveyance path 46a of the third side-alignment conveyor 46 along the X-axis direction. The processing targets S placed on the inclined surface 72 slide toward the fourth end 72d of the inclined surface 72 under their own weight.

The first end 72a of the inclined surface 72 on the narrow conveyor 62 side may be continuous with the downstream end of the conveyance path 62a of the narrow conveyor 62, or may be positioned, with a step, below the downstream end of the conveyance path 62a of the narrow conveyor 62.

The guide 74 is formed in a plate shape. The guide 74 is fixed to the second end 72b of the inclined surface 72. The guide 74 extends along the X-axis direction. The guide 74 is formed so as to protrude upward from the second end 72b (an end close to the other side in the width direction orthogonal to the horizontal component of the first conveyance portion 14 which is in the conveyance direction C1) of the inclined surface 72.

As illustrated in FIGS. 1 and 2, the supply apparatus 10 includes a fourth conveyance portion 20 that is adjacent to the recovery portion 66 that recovers the processing targets S in the third conveyance portion 18 and that conveys the processing targets S recovered by the recovery portion 66, toward the feeder 12.

The fourth conveyance portion 20 includes, for example, a curve conveyor 92. The curve conveyor 92 is provided between the fourth end 72d of the inclined surface 72 of the recovery portion 66, and the feeder 12.

The upstream end of a conveyance path 92a of the curve conveyor 92 is adjacent to the fourth end 72d of the inclined surface 72. The downstream end of the conveyance path 92a of the curve conveyor 92 is adjacent to the feeder 12.

Note that the lengths along the directions of extension D21, D22, and D23 of the first side-alignment conveyor 42, the second side-alignment conveyor 44, and the third side-alignment conveyor 46 of the second conveyance portion 16, the widths orthogonal to the directions of extension D21, D22, and D23, and the angles θa, θb, and θc are set such that, for example, when the processing targets S at the inside end 42c of the downstream end of the conveyance path 42a of the first side-alignment conveyor 42 pass through the first side-alignment conveyor 42, the second side-alignment conveyor 44, and the third side-alignment conveyor 46 as described subsequently, the processing targets S make contact with the outside end 46b of the third side-alignment conveyor 46.

Next, the operation of the supply apparatus 10 will be described.

In the present embodiment, the conveyance speed of the first conveyance portion 14 along the first conveyance direction C1 (C10, C11, C12) matches the movement speed of the processing targets S in contact with the first conveyance portion 14. Similarly, it is assumed that the conveyance speed of the second conveyance portion 16 along the second conveyance directions C21, C22, and C23 matches the movement speed of the processing targets S in contact with the second conveyance portion 16 in a state where the processing targets S do not make contact with the wall portions 52, 54, and 56. It is assumed that the conveyance speed of the third conveyance portion 18 along the third conveyance directions C31, C32 matches the movement speed of the processing targets S in contact with the third conveyance portion 18 in a state where the processing targets S do not make contact with the wall portions 68, 70.

For example, the tipper is inclined, and the processing targets S are fed into the feeder 12. Instead of the tipper or together with the tipper, a worker may feed the processing targets S into the feeder 12.

The processing targets S, which may be in a multi-layered bulk-loaded state in the feeder 12, sequentially move toward the upstream end of the conveyance path 22a of the first conveyor portion 22 of the first conveyance portion 14 due to, for example, inclination of the floor surface of the feeder 12.

At this time, the first conveyor portion 22 of the first conveyance portion 14 removes the processing targets S in contact with the conveyance path 22*a* through the conveyance operation of the conveyance path 22*a*, and separates and spreads the plurality of processing targets S while moving the processing targets S in the conveyance direction C10. The processing targets S in contact with the conveyance path 22*a* of the first conveyor portion 22 are conveyed from the upstream side to the downstream side. In accordance with the conveyance operation of the conveyance path 22*a* of the first conveyor portion 22, other processing targets S overlaid on the upper side of the processing targets S slide with respect to the lower processing targets S in accordance with a frictional force with the lower processing targets S. Therefore, some of the multi-layered processing targets S collapse. Thus, for example, some of the multi-layered processing targets S are separated and scattered.

The processing targets S are delivered from the conveyance path 22*a* of the first conveyor portion 22 to the conveyance path 32*a* of the first inclined conveyor 32 of the second conveyor portion 24.

The conveyance path 32*a* of the first inclined conveyor 32 is inclined as a downward slope. A horizontally inclined component parallel to the upper surfaces of the processing targets S acts on the processing targets S placed on the upper side of the processing targets S which have, for example, a rectangular parallelepiped shape that makes contact with the conveyance path 32*a* of the first inclined conveyor 32. For this reason, the other processing targets S overlaid on the upper side of the processing targets S in contact with the conveyance path 32*a* slide more readily with respect to the processing targets S in contact with the conveyance path 32*a* than when the other processing targets S are horizontal as in the case of the conveyance path 22*a* of the first conveyor portion 22.

The conveyance speed V11 of the conveyance path 32*a* of the first inclined conveyor 32 is lower than the conveyance speed V10 of the conveyance path 22*a* of the first conveyor portion 22. Therefore, due to the conveyance speed difference between the horizontal conveyance path 22*a* of the first conveyor portion 22 and the conveyance path 32*a* of the first inclined conveyor 32, the processing targets S in contact with the conveyance path 32*a* have undergone braking, and the processing targets S on the upper side of the processing targets S in contact with the conveyance path 32*a* slide with respect to the processing targets S in contact with the conveyance path 32*a* according to the law of inertia, and the multi-layered processing targets S collapse.

Therefore, the multi-layered processing targets S collapse in the first inclined conveyor 32 due to the inclined surface, which is the downward-sloping conveyance path 32*a*, and the law of inertia. For this reason, for example, some of the multi-layered processing targets S are separated and scattered.

Depending on the shape and the like of the processing targets S in contact with the conveyance path 32*a* of the first inclined conveyor 32, the processing targets S in contact with the conveyance path 32*a* of the first inclined conveyor 32 roll, and the processing targets S having a plurality of layers such as two layers collapse.

Some of the processing targets S are delivered from the conveyance path 32*a* of the first inclined conveyor 32 of the second conveyor portion 24 to the conveyance path 34*a* of the second inclined conveyor 34 of the second conveyor portion 24 in a state of a plurality of layers, for example.

The conveyance path 34*a* of the second inclined conveyor 34 is inclined as an upward slope. For this reason, the other processing targets S overlaid on the upper side of the processing targets S in contact with the conveyance path 34*a* slide more readily with respect to the processing targets S in contact with the conveyance path 34*a* than when the other processing targets S are horizontal as in the case of the conveyance path 22*a* of the first conveyor portion 22.

The conveyance speed V12 of the conveyance path 34*a* of the second inclined conveyor 34 is higher than the conveyance speed V11 of the conveyance path 32*a* of the first inclined conveyor 32. Therefore, due to the conveyance speed difference between the conveyance path 32*a* of the first inclined conveyor 32 and the conveyance path 34*a* of the second inclined conveyor 34, the processing targets S in contact with the conveyance path 34*a* enter an accelerated state, and the processing targets S on the upper side of the processing targets S in contact with the conveyance path 34*a* slide with respect to the processing targets S in contact with the conveyance path 34*a* according to the law of inertia, and the multi-layered processing targets S collapse.

Therefore, the multi-layered processing targets S further collapse in the second inclined conveyor 34 due to the inclined surface, which is the upward-sloping conveyance path 34*a*, and the law of inertia. For this reason, for example, some of the multi-layered processing targets S are separated and scattered.

In this manner, the multi-layered processing targets S collapse due to the first conveyor portion 22 and the second conveyor portion 24 and are separated one by one. These multi-layered processing targets S may be components of the same type or components of different types.

The processing targets S are then delivered from the second inclined conveyor 34 to the first side-alignment conveyor 42. Due to the step H between the second inclined conveyor 34 and the first side-alignment conveyor 42, when the processing targets S are delivered from the second inclined conveyor 34 to the first side-alignment conveyor 42, the processing targets S move significantly. At this time, the processing targets S are separated as a result of the processing targets being pulled so as to be removed along the conveyance direction C21 by the first side-alignment conveyor 42 on the downstream side of the second inclined conveyor 34.

Note that, in FIG. 3, an example is illustrated in which the step H is provided between the second inclined conveyor 34 and the first side-alignment conveyor 42. For example, a conveyor having a horizontal conveyance path may be arranged between the second inclined conveyor 34 and the first side-alignment conveyor 42, and the step H may be between the conveyor having the horizontal conveyance path, and the first side-alignment conveyor 42.

The processing targets S separated one by one move in the conveyance direction C21 inclined with respect to the direction of extension D21 of the first side-alignment conveyor 42 from the upstream side toward the downstream side, on the conveyance path 42*a* of the first side-alignment conveyor 42. Therefore, the plurality of processing targets S are brought toward the first wall portion 52 on the conveyance path 42*a* of the first side-alignment conveyor 42. For this reason, the distances in the width direction of the plurality of processing targets S gradually decrease from the upstream side toward the downstream side. Some of the processing targets S then abut against the first wall portion 52 between the upstream end and the downstream end of the conveyance path 42a of the first side-alignment conveyor 42.

The processing targets S abutting against the first wall portion 52 on the conveyance path 42a of the first side-alignment conveyor 42 move in a direction along the direction of extension D21 of the conveyance path 42a at a speed of V21·cos θa. The processing targets S move along the first wall portion 52 and are delivered from the conveyance path 42a of the first side-alignment conveyor 42 to the conveyance path 44a of the second side-alignment conveyor 44. Thus, the auxiliary conveyance portion 52a of the first wall portion 52 prevents the first wall portion 52 from hindering the movement of the processing targets S when the processing targets S make contact with the first wall portion 52.

The processing targets S move in the conveyance direction C22 inclined with respect to the direction of extension D22 of the second side-alignment conveyor 44 from the upstream side toward the downstream side, on the conveyance path 44a of the second side-alignment conveyor 44. At this time, the conveyance direction of the processing targets S changes from the direction along the direction of extension D21 or the direction along the conveyance direction C21 to the direction along the conveyance direction C22. Therefore, the plurality of processing targets S are brought toward the second wall portion 54 on the conveyance path 44a of the second side-alignment conveyor 44. For this reason, the distances in the width direction of the plurality of processing targets S gradually decrease. Some of the processing targets S then abut against the second wall portion 54 between the upstream end and the downstream end of the conveyance path 44a of the second side-alignment conveyor 44. Therefore, the plurality of processing targets S approaches a state of one line.

The processing targets S abutting against the second wall portion 54 on the conveyance path 44a of the second side-alignment conveyor 44 move in a direction along the direction of extension D22 of the conveyance path 44a at a speed of V22·cos θb. The processing targets S move along the second wall portion 54 and are delivered from the conveyance path 44a of the second side-alignment conveyor 44 to the conveyance path 46a of the third side-alignment conveyor 46. Thus, the auxiliary conveyance portion 54a of the second wall portion 54 prevents the second wall portion 54 from hindering the movement of the processing targets S when the processing targets S make contact with the second wall portion 54.

The processing targets S move in the conveyance direction C23 inclined with respect to the direction of extension D23 of the third side-alignment conveyor 46 from the upstream side toward the downstream side, on the conveyance path 46a of the third side-alignment conveyor 46. At this time, the conveyance direction of the processing targets S changes from the direction along the direction of extension D22 or the direction along the conveyance direction C22 to the direction along the conveyance direction C23. Therefore, the plurality of processing targets S are brought toward the third wall portion 56 on the conveyance path 46a of the third side-alignment conveyor 46. For this reason, the distances in the width direction of the plurality of processing targets S gradually decrease. Some of the processing targets S then abut against the third wall portion 56 between the upstream end and the downstream end of the conveyance path 46a of the third side-alignment conveyor 46.

As described above, the plurality of processing targets S conveyed along the center in the width direction of the conveyance path 14a of the first conveyance portion 14 move through the conveyance path 42a of the first side-alignment conveyor 42, the conveyance path 44a of the second side-alignment conveyor 44, and the conveyance path 46a of the third side-alignment conveyor 46, that is, the laterally aligned states orthogonal to the directions of extension D21, D22, and D23 are gradually eliminated as the direction is changed. The plurality of processing targets S are then arranged in one line, for example, on the conveyance path 46a of the third side-alignment conveyor 46. In this manner, the second conveyance portion 16 arranges the plurality of processing targets S in a line while bringing, as a whole, the plurality of processing targets S in one direction in the width direction orthogonal to the directions of extension D21, D22, and D23 of the U-shaped second conveyance path 16a.

The processing targets S abutting against the third wall portion 56 on the conveyance path 46a of the third side-alignment conveyor 46 move in a direction along the direction of extension D23 of the conveyance path 46a at a speed of V23·cos θc. The processing targets S move along the third wall portion 56 and are delivered from the conveyance path 46a of the third side-alignment conveyor 46 to the conveyance path 62a of the narrow conveyor 62. Thus, the auxiliary conveyance portion 56a of the third wall portion 56 prevents the third wall portion 56 from hindering the movement of the processing targets S when the processing targets S make contact with the third wall portion 56.

The conveyance speed V31 of the conveyance path 62a of the narrow conveyor 62 is higher than V23·cos θc. Therefore, when the processing targets S are delivered from the conveyance path 46a of the third side-alignment conveyor 46 to the conveyance path 62a of the narrow conveyor 62, the conveyance path 62a of the narrow conveyor 62 widens the pitch of the plurality of processing targets S arranged in one line.

The processing targets S abutting against the fourth wall portion 68 on the conveyance path 62a of the narrow conveyor 62 move in a direction along a predetermined conveyance direction C31 (direction of extension D31) of the conveyance path 62a at a speed of V31. The processing targets S move along the fourth wall portion 68 and are delivered from the conveyance path 62a of the narrow conveyor 62 to the conveyance path 64a of the speed-regulating conveyor 64. Thus, the auxiliary conveyance portion 68a of the fourth wall portion 68 prevents the fourth wall portion 68 from hindering the movement of the processing targets S when the processing targets S make contact with the fourth wall portion 68.

When the processing targets S are delivered from the conveyance path 62a of the narrow conveyor 62 of the third conveyance portion 18 to the conveyance path 64a of the speed-regulating conveyor 64 of the third conveyance portion 18, the conveyance speed V32 of the conveyance path 64a of the speed-regulating conveyor 64 of the third conveyance portion 18 is appropriately controlled based on, for example, before and after information on the processing targets S on the conveyance path 62a recognized by the camera. That is, acceleration and deceleration of the conveyance speed V32 along the predetermined conveyance direction C32 (direction of extension D32) of the conveyance path 64a of the speed-regulating conveyor 64 of the third conveyance portion 18 are controlled, and the processing targets S arranged in one line are separated at a predetermined pitch on the conveyance path 64a of the speed-regulating conveyor 64 of the third conveyance portion 18.

The processing targets S separated by a predetermined pitch and arranged in one line are fed into the load feeder 112 of the distribution sorter 110 of the distribution system on the downstream side of the third conveyance portion 18. Alternatively, the processing targets S arranged in one line at a predetermined pitch are fed into the component feeder of the manufacturing line on the downstream side of the third conveyance portion 18.

When the processing targets S are abutting against the rollers 70b of the auxiliary conveyance portion 70a, the rollers 70b of the auxiliary conveyance portion 70a rotate in that position, and move the processing targets S from the upstream side to the downstream side at the speed V32 of the conveyance path 64a of the speed-regulating conveyor 64 of the third conveyance portion 18 and parallel to the direction of extension D32. Thus, in the auxiliary conveyance portion 70a of the fifth wall portion 70, the friction between the fifth wall portion 70 and the processing targets S prevents the movement of the processing targets S from being hindered.

There is a possibility that the plurality of processing targets S are not arranged in one line on the conveyance path 46a of the third side-alignment conveyor 46, and are arranged in the width direction orthogonal to the direction of extension D23 of the third side-alignment conveyor 46, on the conveyance path 46a of the third side-alignment conveyor 46. On the conveyance path 46a of the third side-alignment conveyor 46, among the processing targets S not arranged in one line, those processing targets S which have been separated in the width direction from the third wall portion 56 are not conveyed from the downstream end of the conveyance path 46a of the third side-alignment conveyor 46 to the conveyance path 62a of the narrow conveyor 62 and are delivered to the inclined surface 72 of the fourth conveyance portion 20. Therefore, the processing targets S reach the fourth end 72d of the inclined surface 72 while sliding near the boundary between the inclined surface 72 and the guide 74.

The processing targets S that have reached the fourth end 72d of the inclined surface 72 are conveyed to the feeder 12 by the curve conveyor 92. Thus, the recovery portion 66 and the fourth conveyance portion 20 convey, among the processing targets S, those processing targets S which have failed to be aligned in one direction in the second conveyance portion 16, toward the first conveyance portion 14. Therefore, the recovery portion 66 is capable of recovering some of the processing targets S aligned in one direction in the second conveyance portion 16, among the processing targets S. Therefore, the processing targets S which have been recovered by the recovery portion 66 and conveyed from the fourth conveyance portion 20 to the feeder 12 are once again arranged at a predetermined pitch with respect to other processing targets S by passing, from the feeder 12, through the first conveyance portion 14, the second conveyance portion 16, and the third conveyance portion 18, and are fed into the load feeder 112 of the distribution sorter 110 of the distribution system or into the component feeder of the manufacturing line.

Thus, the first conveyance portion 14 of the supply apparatus 10 according to the present embodiment is used as a separation stage that separates, one by one, the plurality of bulk-loaded processing targets S. The second conveyance portion 16 is used as an arrangement stage for arranging, into one line, the processing targets S that have been separated one by one. The third conveyance portion 18 is used as an adjustment stage that separates the processing targets S that have been arranged in one line, at a predetermined pitch. Further, the supply apparatus 10 according to the present embodiment is capable of conveying the plurality of processing targets S to the first conveyance portion (separation stage) 14, the second conveyance portion (arrangement stage) 16, and the third conveyance portion (adjustment stage) 18 in that order and of delivering the plurality of processing targets S to another apparatus.

At this time, regardless of whether the processing targets S are of the same kind or of different kinds, when, for example, many kinds of processing targets S are fed into the feeder 12 at the same time, the processing targets S can be fed into the load feeder 112 of the distribution sorter 110 or into the component feeder of the manufacturing line in a state where the processing targets S have been separated in the first conveyance portion 14, the processing targets S have been arranged in a line in the second conveyance portion 16, and the processing targets S have been separated at a predetermined pitch in the third conveyance portion 18. Therefore, the processing targets S which have been fed into the feeder 12 can be automatically separated by the supply apparatus 10 using the first conveyance portion 14, the second conveyance portion 16, and the third conveyance portion 18, and can be arranged in one line and spaced at a predetermined pitch. The processing targets S can then be delivered from the supply apparatus 10 to a later-stage apparatus.

In the first conveyance portion 14, the bulk-loaded processing targets S can be separated one by one using a plurality of conveyance portions such as the first conveyor portion 22 and the first inclined conveyor 32 and the second inclined conveyor 34 of the second conveyor portion 24. Therefore, in the second conveyance portion 16, it is possible to avoid a state in which the processing targets S have multiple layers. For this reason, the plurality of processing targets S are readily arranged in one line.

Note that the supply apparatus 10 according to the present embodiment feeds processing targets S having different sizes, materials, and shapes into the first conveyance portion 14 regardless of whether the processing targets S are of different types or of the same type, thus enabling the processing targets S to be separated at a predetermined pitch and delivered to another apparatus. By appropriately forming the conveyance path 16a of the second conveyance portion 16, the supply apparatus 10 according to the present embodiment is capable of handling relatively small processing targets S such as bolts or nuts, processing targets S which are larger than bolts or nuts such as beverage bottles, and relatively large processing targets S such as home delivery items.

In the present embodiment, due to the step H between the second inclined conveyor 34 and the first side-alignment conveyor 42, the processing targets S are moved significantly when being delivered from the second inclined conveyor 34 to the first side-alignment conveyor 42. At this time, the processing targets S can be separated as a result of the processing targets being pulled so as to be removed along the conveyance direction C21 by the first side-alignment conveyor 42 on the downstream side of the second inclined conveyor 34.

In the supply apparatus 10 according to the present embodiment, for example, the conveyance speed V21 of the conveyance path 42a of the first side-alignment conveyor 42 of the second conveyance portion 16 is increased with respect to the conveyance speed V12 of the conveyance path 32a of the second inclined conveyor 34 of the first conveyance portion 14; the conveyance speed V22 of the conveyance path 44a of the second side-alignment conveyor 44 is increased with respect to the conveyance speed V21 of the conveyance path 42a of the first side-alignment conveyor 42; the conveyance speed V23 of the conveyance path 46a of the third side-alignment conveyor 46 is increased with respect to the conveyance speed V22 of the conveyance path 44a of the second side-alignment conveyor 44; and the conveyance speed V31 of the conveyance path 62a of the narrow conveyor 62 is increased with respect to the conveyance speed V23 of the conveyance path 46a of the third side-alignment conveyor 46. In this case, at the time of delivery of the conveyance paths 32a, 42a, 44a, 46a, and 62a, the distance between the processing targets S along the conveyance direction due to the speed difference can be taken. Therefore, the processing targets S can be prevented from staying on the conveyance path 16a of the second conveyance portion 16, and the processing targets S can be separated. Therefore, the processing targets S are prevented from interfering with each other, and the processing targets S are readily arranged in one line on the conveyance path 46a.

In addition, the supply apparatus 10 according to the present embodiment includes a plurality of conveyors 42, 44, and 46 for which the directions of extension D21, D22, and D23 of the second conveyance portion 16 are U-shaped overall. The directions of extension D21, D22, and D23 of the plurality of conveyors 42, 44, and 46 are straight, for example. Therefore, it is possible to suppress an increase in costs in comparison with a case where the conveyors 42, 44, and 46 are integrally formed according to the space.

Because the directions of extension D21, D22, and D23 of the second conveyance portion 16 are U-shaped overall, it is easy to arrange the first conveyance portion 14 on the upstream side of the second conveyance portion 16 and the third conveyance portion 18 on the downstream side of the second conveyance portion 16 in a state of facing each other in the Y-axis direction. In addition, the horizontal components of the first conveyance portion 14 which are in the directions of extension D10, D11, and D12 can be made parallel to the direction of extension D31 of the narrow conveyor 62 and the direction of extension D32 of the speed-regulating conveyor 64 of the third conveyance portion 18. Therefore, the supply apparatus 10 according to the present embodiment can be arranged in a space-saving manner. By appropriately setting the angles θ1 and θ2 and the angles θa, θb, and θc and appropriately setting the lengths and widths of the conveyance portions 14, 16, and 18, the supply apparatus 10 can be formed according to the installation space. For example, by appropriately setting the lengths of the directions of extension D21, D22, and D23 of the plurality of conveyors 42, 44, and 46, the widths orthogonal to the directions of extension D21, D22, and D23 and the inclination angles θa, θb, and θc of the conveyors 42, 44, and 46, the size, shape, and the like of the second conveyance portion 16 can be appropriately set.

In the present embodiment, the narrow conveyor 62 of the third conveyance portion 18 has been described as using an endless belt. For example, ball rollers arranged in a grid may be used. In this case, for example, the processing targets S placed on the narrow conveyor 62 can be pushed out from the wall portion 68 to the recovery portion 66. Therefore, the recovery portion 66 is capable of recovering some of the processing targets S aligned in one direction in the second conveyance portion 16, among the processing targets S. For example, the supply apparatus 10 is capable of selectively conveying processing targets S of the same type or processing targets S of the same size to the third conveyance portion 18.

In the present embodiment, the second conveyance portion 16 has been described as having the narrow conveyor 62. Instead of the narrow conveyor 62, a roller conveyor (not illustrated) having a width substantially equal to that of the third side-alignment conveyor 46 and extending in a direction of extension parallel to the direction of extension D32 like the third conveyance portion 18, for example, may be used. In this case, for example, a gate may be provided between the terminal end of the third side-alignment conveyor 46 and the roller conveyor arranged on the downstream side of the third side-alignment conveyor 46. Sorting can be performed to determine whether or not to convey the processing targets S to the third conveyance portion 18 by opening and closing the gate or by detecting processing targets S at the gate.

The gate may be provided on the conveyance path 64a of the speed-regulating conveyor 64 of the third conveyance portion 18. When the conveyance speed of the conveyance path 64a of the speed-regulating conveyor 64 of the third conveyance portion 18 is set to a constant speed, the timing for passing through the gate can be adjusted by opening and closing the gate, and the interval between the processing targets S can be separated by a predetermined distance.

In the present embodiment, the third conveyance portion 18 has been described as having the narrow conveyor 62. Instead of the narrow conveyor 62, the processing targets S may be delivered from the third side-alignment conveyor 46 to the speed-regulating conveyor 64 of the third conveyance portion 18 through adsorption by a robot arm, for example. In this case also, sorting can be performed to determine whether or not to convey processing targets S to the third conveyance portion 18 by detecting the processing targets S using a sensor attached to the robot arm.

A robot arm may be used instead of the conveyance path 18a of the third conveyance portion 18. The third conveyance portion 18 may be a robot. The processing targets S conveyed to the downstream end of the third side-alignment conveyor 46 of the second conveyance portion 16, for example, may be directly fed, by the robot arm, into the load feeder 112 of the distribution sorter 110 of the distribution system or into the component feeder of the manufacturing line, for example.

As the recovery portion 66 of the third conveyance portion 18, instead of the inclined surface 72 and the guide 74, a collection container (not illustrated) for collecting processing targets S that are not arranged in a line in one direction may be installed, in the second conveyance portion 16, in a position adjacent to the narrow conveyor 62 of the third conveyance portion 18 at the downstream end of the third side-alignment conveyor 46 of the second conveyance portion 16. After the processing targets S are collected for an appropriate time in the collection container serving as the recovery portion 66, the collection container may be moved to refeed each processing target S into the feeder 12. Therefore, the fourth conveyance portion 20 is not necessarily required.

The fourth conveyance portion 20 may use, for example, a straight conveyor or a vertical sorter instead of the curve conveyor 92. The position at the upstream end of the fourth conveyance portion 20 is a position adjacent to the speed-regulating conveyor 64 in FIG. 2. The position at the upstream end of the fourth conveyance portion 20 may be a position adjacent to the narrow conveyor 62.

In the above-described example, a case where the auxiliary conveyance portions 52a, 54a, 56a, and 68a in which the first wall portion 52, the second wall portion 54, the third wall portion 56, and the fourth wall portion 68 actively move are provided has been described. The first wall portion 52, the second wall portion 54, the third wall portion 56, and the fourth wall portion 68 may be configured to passively convey the processing targets S from the upstream side to the downstream side. In a case where the first wall portion 52, the second wall portion 54, the third wall portion 56, and the fourth wall portion 68 passively convey the processing targets S from the upstream side to the downstream side, the configuration is preferably similar to that of the auxiliary conveyance portion 70a. All of the auxiliary conveyance portions 52a, 54a, 56a, 68a, and 70a may be configured to actively convey the processing targets S from the upstream side toward the downstream side. All of the auxiliary conveyance portions 52a, 54a, 56a, 68a, and 70a may be configured to passively operate in accordance with conveyance of the processing targets S along the adjacent conveyance paths 42a, 44a, 46a, 62a, and 64a to convey the processing targets S from the upstream side toward the downstream side.

As described hereinabove, according to the present embodiment, it is possible to provide a supply apparatus 10 that facilitates handling of processing targets S in a multi-layered bulk-loaded state or the like by the distribution sorter 110 or a later-stage apparatus of a manufacturing line or the like, for example.

Second Embodiment

A supply apparatus 10 according to a second embodiment will be described using FIGS. 5 and 6. The same members or members having the same functions as the members described in the first embodiment are denoted by the same reference signs as much as possible, and a detailed description thereof will be omitted.

Figure 5:
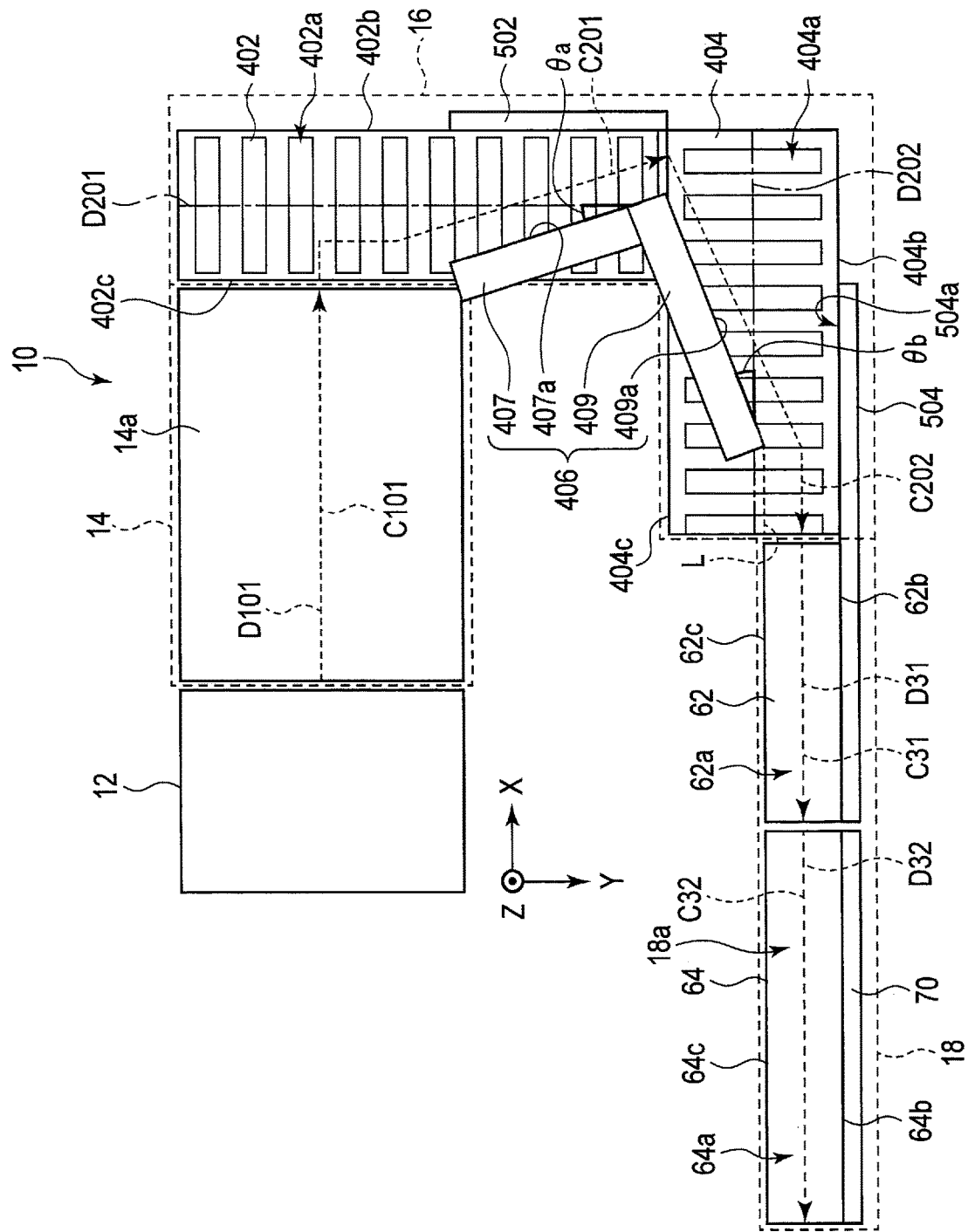
FIG. 5 is a schematic view illustrating a state in which a supply apparatus according to a second embodiment is viewed from above.

FIG. 5 is a schematic view illustrating a state in which the supply apparatus 10 according to the present embodiment is viewed from above. An XYZ orthogonal coordinate system is defined in the supply apparatus 10 in FIG. 5. FIG. 6 illustrates a state in which the outside (one direction) is viewed from the inside (another direction) of the end, in the width direction orthogonal to the direction of extension, of a conveyance path. Therefore, FIG. 6 is a schematic view illustrating conveyance paths when it is assumed that the directions of extension D (D101, D201, D202, D31, D32) of a series of conveyance paths of the supply apparatus 10 illustrated in FIG. 5 are straight.

As illustrated in FIGS. 5 and 6, the first conveyance portion 14 includes the first conveyance path 14a, which conveys processing targets S from the upstream side to the downstream side along a first conveyance direction C101. The direction of extension D101 of the first conveyance portion 14 is straight along the X-axis direction.

The first conveyance portion 14 uses, in the present embodiment, a vibration conveyor (vibration feeder), for example, instead of using the first conveyor portion 22 and the second conveyor portion 24 described in the first embodiment.

The second conveyance portion 16 includes a second conveyance path 16a bent in an L shape. The second conveyance path 16a of the second conveyance portion 16 conveys the processing targets S from the upstream side to the downstream side along second conveyance directions C201 and C202.

As illustrated in FIG. 5, when the supply apparatus 10 is viewed from above, a horizontal component of the first conveyance path 14a which is in the first conveyance direction C1 and horizontal components of a third conveyance path 18a which are in third conveyance directions C31 and C32 are each straight. The horizontal component of the first conveyance path 14a which is in the first conveyance direction C1 and the horizontal components of the third conveyance path 18a which are in the third conveyance directions C31 and C32 are parallel (including substantially parallel) to each other and are directed in opposite directions. In FIG. 5, the first conveyance portion 14 and the third conveyance portion 18 are shifted in the X-axis direction, but may face each other in the Y-axis direction depending on the settings for the width, size, and the like, of each conveyor.

As illustrated in FIG. 5, the second conveyance portion 16 includes a first roller conveyor (conveyance portion) 402 adjacent to the downstream side along the X axis of the first conveyance portion 14, a second roller conveyor (conveyance portion) 404 adjacent on the downstream side along the Y axis of the first roller conveyor 402, and guides 406 provided on the conveyance path 402a of the first roller conveyor 402 and the conveyance path 404a of the second roller conveyor 404. In the second conveyance portion 16, the plurality of conveyors (conveyance portions) 402, 404 are connected so as to have each different directions of extension D201, D202, and conveyance directions C201, C202. The directions of extension D201, D202 of the plurality of conveyors 402, 404 of the second conveyance portion 16 are L-shaped overall. The two conveyors 402, 404 may be arranged adjacent to each other, and do not need to be integrated as one conveyor.

The first roller conveyor 402 of the second conveyance portion 16 is installed on the downstream side of the first conveyance portion 14 along a direction intersecting the first conveyance portion 14. The second roller conveyor 404 is installed on the downstream side of the first roller conveyor 402 along a direction intersecting the first roller conveyor 402.

The conveyance path 402a of the first roller conveyor 402 is, for example, parallel to the plane XY. The conveyance path 404a of the second roller conveyor 404 is, for example, parallel to the plane XY. The direction of extension D201 of the first roller conveyor 402 and the conveyance direction of the conveyance path 402a of the first roller conveyor 402 are parallel. The direction of extension D202 of the second roller conveyor 404 and the conveyance direction of the conveyance path 404a of the second roller conveyor 404 are parallel. The direction of extension D201 of the first roller conveyor 402 and the direction of extension D202 of the second roller conveyor 404 are, for example, orthogonal to each other.

At an end (outside end) 402b in one direction in the width direction orthogonal to the direction of extension D201 of the first roller conveyor 402, a first wall portion 502 serving as a wall that prevents the processing targets S from falling off from one direction of the first roller conveyor 402 is provided. The first wall portion 502 extends, for example, parallel to the direction of extension D201 of the conveyance path 402a of the first roller conveyor 402. Due to the presence of the first wall portion 502, the processing targets S are prevented from falling off from the end 402b in one direction of the first roller conveyor 402.

The first wall portion 502 includes an auxiliary conveyance portion 502a that actively or passively conveys the processing targets S along the first direction of extension D201 from the upstream side to the downstream side of the conveyance path 402a of the first roller conveyor 402. The auxiliary conveyance portion 502a of the first wall portion 502 is directed toward the other end (inside end) 402c in the width direction orthogonal to the direction of extension D201 of the first roller conveyor 402.

In the present embodiment, the auxiliary conveyance portion 502a of the first wall portion 502 includes, for example, a plurality of rollers 502b that passively rotate upon contact with the processing targets S. The rollers 502b in FIG. 6 are each formed in a spherical shape and are freely rotatable in these positions.

At an end (outside end) 404b in one direction in the width direction orthogonal to the direction of extension D202 of the second roller conveyor 404, a second wall portion 504 serving as a wall that prevents the processing targets S from falling off from one direction of the second roller conveyor 404 is provided. The second wall portion 504 extends, for example, parallel to the direction of extension D202 of the conveyance path 404a of the second roller conveyor 404. Due to the presence of the second wall portion 504, the processing targets S are prevented from falling off from the end 404b in one direction of the second roller conveyor 404.

The second wall portion 504 includes an auxiliary conveyance portion 504a that actively or passively conveys the processing targets S along the second direction of extension D202 from the upstream side to the downstream side of the conveyance path 404a of the second roller conveyor 404. The auxiliary conveyance portion 504a of the second wall portion 504 is directed toward the other end (inside end) 404c in the width direction orthogonal to the direction of extension D202 of the second roller conveyor 404.

In the present embodiment, the auxiliary conveyance portion 504a of the second wall portion 504 includes, for example, a plurality of rollers 504b that passively rotate upon contact with the processing targets S. The rollers 504b in FIG. 6 are each formed in a spherical shape and are freely rotatable in these positions.

Note that the second wall portion 504 is also extended to an end (outside end) 62b of a narrow conveyor 62. The auxiliary conveyance portion 504a of the second wall portion 504 is directed toward the other end (inside end) 62c in the width direction orthogonal to the direction of extension D31 of the narrow conveyor 62. Assuming that a virtual extension line L of the other end (inside end) 62c of the narrow conveyor 62 is parallel to the direction of extension D202 of the second roller conveyor 404, the extension line L preferably intersects a guide surface 409a of a second guide rod 409 described subsequently.

In the present embodiment, the guide 406 includes a first guide rod 407 and the second guide rod 409.

The first guide rod 407 includes a guide surface 407a inclined with respect to the direction of extension D201 of the first roller conveyor 402 on the conveyance path 402a of the first roller conveyor 402. The first guide rod 407 is fixed to, for example, the end 402c. The guide surface 407a of the first guide rod 407 is directed toward the end 402b in one direction in the width direction orthogonal to the direction of extension D201. The guide surface 407a is directed from the end 402c toward the end 402b from the upstream side toward the downstream side. Note that the guide surface 407a is separated from the end 402b by a distance that enables the processing targets S to pass therethrough.

The second guide rod 409 includes the guide surface 409a inclined with respect to the direction of extension D202 of the second roller conveyor 404 on the conveyance path 404a of the second roller conveyor 404. The second guide rod 409 is fixed to, for example, the end 404c. The guide surface 409a of the second guide rod 409 is directed toward the end 404b in one direction in the width direction orthogonal to the direction of extension D202. The guide surface 409a is directed from the end 404c toward the end 404b from the upstream side toward the downstream side. Note that the guide surface 409a is separated from the end 404b by a distance that enables the processing targets S to pass therethrough.

Next, the operation of the supply apparatus 10 will be described.

The processing targets S, which are in a multi-layered bulk-loaded state, for example, in a feeder 12, sequentially move toward the upstream end of the conveyance path 22a of the first conveyor portion 22 of the first conveyance portion 14 due to, for example, inclination of the floor surface of the feeder 12.

At this time, the conveyance path 14a of the first conveyance portion 14 removes the processing targets S in contact with the conveyance path 14a by the conveyance operation of the conveyance path 14a. The conveyance path 14a of the first conveyance portion 14 conveys the plurality of processing targets S in the conveyance direction C101 while vibrating. For this reason, the conveyance path 14a of the first conveyance portion 14 separates and spreads the plurality of multi-layered processing targets S in a path from the upstream end to the downstream end, for example.

In this manner, the multi-layered processing targets S collapse due to the first conveyance portion 14 and are separated one by one. These multi-layered processing targets S may be components of the same type or components of different types.

The processing targets S move along the first conveyance direction C101 and are delivered from the conveyance path 14a of the first conveyance portion 14 to the conveyance path 402a of the first roller conveyor 402. At this time, the conveyance direction of the processing targets S changes from the direction along the first conveyance direction C101 to the direction along the direction of extension D201. Some of the processing targets S separated one by one are guided by the guide surface 407a of the first guide rod 407 from the upstream side toward the downstream side on the conveyance path 402a of the first roller conveyor 402, and moves along a broken line indicated by reference sign C201 inclined with respect to the direction of extension D201 of the first roller conveyor 402. Therefore, the plurality of processing targets S are brought toward the first wall portion 502 on the conveyance path 402a of the first roller conveyor 402. For this reason, the distances in the width direction of the plurality of processing targets S gradually decrease from the upstream side toward the downstream side. Some of the processing targets S then abut against the first wall portion 502 between the upstream end and the downstream end of the conveyance path 402a of the first roller conveyor 402.

Therefore, the first roller conveyor 402 is capable of bringing the processing targets S placed on the conveyance path 402a of the first roller conveyor 402 in one direction in the width direction orthogonal to the direction of extension D201, that is, one end 402b, in cooperation with the guide surface 407a of the first guide rod 407. The processing targets S can move on the conveyance path 402a of the first roller conveyor 402, for example, as indicated by reference sign C201.

The processing targets S abutting against the first wall portion 502 on the conveyance path 402a of the first roller conveyor 402 move in a direction along the direction of extension D201 of the conveyance path 402a, at the conveyance speed of the conveyance path 402a. The processing targets S move along the first wall portion 502 and are delivered from the conveyance path 402a of the first roller conveyor 402 to the conveyance path 404a of the second roller conveyor 404.

At this time, the conveyance direction of the processing targets S changes from the direction along the direction of extension D201 or the conveyance direction C201 to the direction along the direction of extension D202. The processing targets S are guided by the guide surface 409a of the second guide rod 409 from the upstream side toward the downstream side on the conveyance path 404a of the second roller conveyor 404, and moves along a broken line indicated by reference sign C202 inclined with respect to the direction of extension D202 of the second roller conveyor 404. Therefore, the plurality of processing targets S are brought toward the second wall portion 504 on the conveyance path 404a of the second roller conveyor 404. For this reason, the distances in the width direction of the plurality of processing targets S gradually decrease. Some of the processing targets S then abut against the second wall portion 504 between the upstream end and the downstream end of the conveyance path 404a of the second roller conveyor 404.

Therefore, the second roller conveyor 404 is capable of bringing the processing targets S placed on the conveyance path 404a of the second roller conveyor 404 in one direction in the width direction orthogonal to the direction of extension D202, that is, one end 404b, in cooperation with the guide surface 409a of the second guide rod 409. The processing targets S can move on the conveyance path 404a of the second roller conveyor 404, for example, as indicated by reference sign C202.

As described above, the plurality of processing targets S conveyed along the center in the width direction of the conveyance path 14a of the first conveyance portion 14 move through the conveyance path 402a of the first roller conveyor 402 and the conveyance path 404a of the second roller conveyor 404, that is, the laterally aligned states orthogonal to the directions of extension D201, D202 are gradually eliminated as the direction is changed. The plurality of processing targets S are then arranged in one line on the conveyance path 404a of the second roller conveyor 404. In this manner, the second conveyance portion 16 arranges the plurality of processing targets S in a line while bringing, as a whole, the plurality of processing targets S in one direction in the width direction orthogonal to the directions of extension D201, D202 of the L-shaped second conveyance path 16a.

The processing targets S move along the second wall portion 504 and are delivered from the conveyance path 404a of the second roller conveyor 404 to the conveyance path 62a of the narrow conveyor 62 of the third conveyance portion 18.

Thereafter, the processing targets S arranged in one line are separated at a predetermined pitch in the conveyance path 64a of the speed-regulating conveyor 64 of the third conveyance portion 18.

The processing targets S separated by a predetermined pitch and arranged in one line are fed into the load feeder 112 of the distribution sorter 110 of the distribution system illustrated in FIG. 4 on the downstream side of the third conveyance portion 18. Alternatively, the processing targets S arranged in one line at a predetermined pitch are fed into the component feeder of the manufacturing line on the downstream side of the third conveyance portion 18.

Although an example in which the guide 406 includes the first guide rod 407 and the second guide rod 409 has been described, the first guide rod 407 and the second guide rod 409 may be integrated as a whole, for example, in an L shape.

Thus, the first conveyance portion 14 of the supply apparatus 10 according to the present embodiment is used as a separation stage that separates the plurality of bulk-loaded processing targets S. The second conveyance portion 16 is used as an arrangement stage for arranging, into one line, the processing targets S that have been separated. The third conveyance portion 18 is used as an adjustment stage that separates the processing targets S that have been arranged in one line, at a predetermined pitch. Further, the supply apparatus 10 according to the present embodiment is capable of conveying the plurality of processing targets S to the first conveyance portion (separation stage) 14, the second conveyance portion (arrangement stage) 16, and the third conveyance portion (adjustment stage) 18 in that order and of delivering the plurality of processing targets S to another apparatus.

At this time, regardless of whether the processing targets S are of the same kind or of different kinds, when, for example, many kinds of processing targets S are fed into the feeder 12 at the same time, the processing targets S can be fed into the load feeder 112 of the distribution sorter 110 or into the component feeder of the manufacturing line in a state where the processing targets S have been separated in the first conveyance portion 14, the processing targets S have been arranged in a line in the second conveyance portion 16, and the processing targets S have been separated at a predetermined pitch in the third conveyance portion 18. Even if the processing targets S are of the same type, processing targets S having different sizes, materials, and shapes are fed into the first conveyance portion 14, thus enabling the processing targets S to be separated at a predetermined pitch and delivered to another apparatus. Note that, by appropriately forming the conveyance paths 402a, 404a of the second conveyance portion 16, the supply apparatus 10 according to the present embodiment is capable of handling not only relatively small processing targets S such as bolts or nuts, but also relatively large processing targets S such as home delivery items.

In addition, the supply apparatus 10 according to the present embodiment includes the plurality of conveyors 402, 404 for which the directions of extension D201, D202 of the second conveyance portion 16 are L-shaped overall. The directions of extension D201, D202 of the plurality of conveyors 402, 404 are straight, for example. Therefore, it is possible to suppress an increase in costs in comparison with a case where the conveyors 402, 404 are integrally formed according to the space.

Further, the direction of extension D101 of the first conveyance portion 14 and the directions of extension D31 and D32 of the third conveyance portion 18 can be made parallel to each other, and the supply apparatus 10 can be disposed in a space-saving manner. By appropriately setting angles θa, θb and appropriately setting the lengths and widths of the conveyance portions 14, 16, and 18, the supply apparatus 10 can be formed according to the installation space.

Note that the vibration conveyor of the first conveyance portion 14 described in the present embodiment may be the second conveyor portion 24 described in the first embodiment, and the first conveyor portion 22 described in the first embodiment may be arranged on the upstream side of the vibration conveyor.

Instead of the vibration conveyor of the first conveyance portion 14 described in the present embodiment, the first conveyor portion 22 and the second conveyor portion 24 described in the first embodiment may be used.

Although the recovery portion 66 and the fourth conveyance portion 20 of the third conveyance portion 18 are not illustrated in FIG. 6, the recovery portion 66 and the fourth conveyance portion 20 of the third conveyance portion 18 described in the first embodiment may be arranged between the downstream end of the second roller conveyor 404 and the feeder 12. If the processing targets S fall off from the end 62b of the narrow conveyor 62 of the third conveyance portion 18 or the end 64c of the speed-regulating conveyor 64 of the third conveyance portion 18, the processing targets S can be recovered by the recovery portion 66. Further, the recovery portion 66 and the fourth conveyance portion 20 convey, among the processing targets S, those processing targets S which have failed to be aligned in one direction in the second conveyance portion 16, toward the first conveyance portion 14. Therefore, the processing targets S are placed once again, via the feeder 12, on the conveyance path 14a of the first conveyance portion 14, pass through the first conveyance portion 14, the second conveyance portion 16, and the third conveyance portion 18, and are arranged at a predetermined pitch with respect to the other processing targets S, and are fed into the load feeder 112 of the distribution sorter 110 of the distribution system illustrated in FIG. 4 or into the component feeder of the manufacturing line.

As described hereinabove, according to the present embodiment, it is possible to provide a supply apparatus 10 that facilitates handling, by a later-stage apparatus, of processing targets S in a multi-layered bulk-loaded state or the like.

In the case of the supply apparatus 10 of at least one embodiment described hereinabove, because the supply apparatus 10 includes the first conveyance portion 14 that separates the processing targets S, the second conveyance portion 16 that arranges the processing targets S in a line, and the third conveyance portion 18 that establishes the processing targets S at a predetermined pitch, it is possible to automatically separate and arrange the processing targets S in a multi-layered bulk-loaded state or the like, establish the processing targets S at a predetermined pitch, and facilitate handling of the processing targets S by a later-stage apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A supply apparatus, comprising:
a first conveyance portion that is configured to remove a plurality of processing targets from a feeder in which the processing targets are placed and that is configured to convey the processing targets along a first conveyance direction;
a second conveyance portion that is disposed on a downstream side of the first conveyance portion, the second conveyance portion conveying the processing targets from an upstream side to the downstream side along a second conveyance direction, and the second conveying portion including a plurality of conveying portions connected along the second conveyance direction, the plurality of conveying portions conveying the processing targets in a direction in which a horizontal component is inclined at a predetermined angle with respect to the second conveyance direction, and bringing the processing targets to one side of each of the plurality of conveying portions, and
in the plurality of conveying portions, the direction in which the processing targets are moved to one side of each of the plurality of conveying portions differing for each of the plurality of conveying portions; and
a third conveyance portion that is disposed on a downstream side of the second conveyance portion and that is configured to convey the processing targets along a third conveyance direction while separating the processing targets from each other at a predetermined pitch by a speed regulation of the third conveyance portion.

2. The supply apparatus according to claim 1, wherein the first conveyance direction and the third conveyance direction are opposite directions to each other.

3. The supply apparatus according to claim 1, wherein:
the second conveyance portion includes:
a first side-alignment conveyance portion provided on the downstream side of the first conveyance portion along the first conveyance direction;
a second side-alignment conveyance portion provided on a downstream side of the first side-alignment conveyance portion along a direction intersecting the first side-alignment conveyance portion; and
a third side-alignment conveyance portion provided on a downstream side of the second side-alignment conveyance portion along a direction intersecting the second side-alignment conveyance portion.

4. The supply apparatus according to claim 1, wherein the third conveyance portion includes a recovery portion that is adjacent to downstream ends of the plurality of conveyance portions in the second conveyance portion and to the third conveyance portion and that is configured to recover some of the processing targets that have been brought in the one direction in the second conveyance portion, among the processing targets.

5. The supply apparatus according to claim 4, further comprising: a fourth conveyance portion that is disposed on a downstream side of the recovery portion and that is configured to convey, to the feeder, the processing targets recovered by the recovery portion.

6. The supply apparatus according to claim 1, wherein:
the first conveyance portion includes:
a removal conveyance portion that is configured to remove the processing targets;
a downward-inclined conveyance portion that is disposed on a downstream side of the removal conveyance portion and that is inclined downward along the first conveyance direction; and
an upward-inclined conveyance portion that is disposed on a downstream side of the downward-inclined conveyance portion and that is inclined upward along the first conveyance direction.

7. The supply apparatus according to claim 6, wherein:
a conveyance speed of the downward-inclined conveyance portion is lower than a conveyance speed of the removal conveyance portion, and
a conveyance speed of the upward-inclined conveyance portion is higher than a conveyance speed of the downward-inclined conveyance portion.

8. The supply apparatus according to claim 1, wherein the second conveyance portion includes a wall portion facing in a direction in which the processing targets are brought in the one direction in the width direction of the second conveyance portion.

9. The supply apparatus according to claim 8, wherein the wall portion includes an auxiliary conveyance portion that is configured to actively or passively convey the processing targets from the upstream side to the downstream side of the second conveyance portion along the second conveyance direction.

10. The supply apparatus according to claim 1, wherein the third conveyance portion is configured to supply the processing targets to a sorting apparatus that is configured to sort the processing targets according to each destination.

* * * * *